(12) United States Patent
Elsom et al.

(10) Patent No.: US 7,059,141 B2
(45) Date of Patent: Jun. 13, 2006

(54) COMBINED ICE AND BEVERAGE DISPENSER AND ICEMAKER

(75) Inventors: Kyle B. Elsom, Batavia, IL (US); Thaddeus M. Jablonski, Palatine, IL (US); Daniel C. Leaver, Westmont, IL (US); Michael A. Zizas, Bloomingdale, IL (US)

(73) Assignee: IMI Cornelius Inc., Anoka, MN (US)

( * ) Notice: Subject to any disclaimer, the term of this patent is extended or adjusted under 35 U.S.C. 154(b) by 0 days.

(21) Appl. No.: 10/833,436

(22) Filed: Apr. 28, 2004

(65) Prior Publication Data

US 2004/0216474 A1   Nov. 4, 2004

Related U.S. Application Data

(60) Provisional application No. 60/466,558, filed on Apr. 29, 2003.

(51) Int. Cl.
*F25C 1/12* (2006.01)

(52) U.S. Cl. .............................. 62/74; 62/337; 62/347
(58) Field of Classification Search .............. 62/66–74, 62/337–356
See application file for complete search history.

(56) References Cited

U.S. PATENT DOCUMENTS

| | | | | | |
|---|---|---|---|---|---|
| 2,297,371 | A | * | 9/1942 | Siedle | 62/67 |
| 2,540,343 | A | * | 2/1951 | Muffly | 62/430 |
| 2,900,803 | A | * | 8/1959 | Horton, Jr. | 62/157 |
| 4,897,099 | A | * | 1/1990 | Ruff | 62/532 |
| 6,276,146 | B1 | * | 8/2001 | Kim et al. | 62/66 |
| 6,334,318 | B1 | * | 1/2002 | Ando et al. | 62/135 |
| 6,460,367 | B1 | * | 10/2002 | DuHack | 62/337 |

* cited by examiner

*Primary Examiner*—William E. Tapolcai
(74) *Attorney, Agent, or Firm*—Pyle & Piontek

(57) ABSTRACT

An ice/beverage dispenser is characterized by an ice/beverage dispensing machine having an integral ice making capacity. An icemaker of the dispenser and the ice and beverage dispensing portion share an evaporator that that is utilized both for chilling beverage water for dispensing and for making ice. The evaporator is efficiently utilized in that one side of it is used for making ice and both sides of it are used for chilling water. The present invention uses a processor based control circuit that operates the refrigeration system between ice-making and water chilling modes in such manner as to ensure that cold beverages will always be served. The ice/beverage dispenser also includes a system for quickly combining and separating the ice making and beverage dispensing water supply, water drain and electrical functions.

32 Claims, 8 Drawing Sheets

COMBINED ICE AND BEVERAGE DISPENSER AND ICEMAKER

This application claims benefit of provisional application Ser. No. 60/466,558, filed Apr. 29, 2003.

FIELD OF THE INVENTION

The present invention relates generally to machines that dispense both beverage and ice and more specifically to such machines in combination with an icemaker.

BACKGROUND OF THE INVENTION

Combination ice/beverage dispensing machines are designed to dispense both ice and beverages. These machines include a plurality of beverage dispensing valves connected to a cooled supply of beverages for dispensing beverages into a cup or other suitable receptacle held below the valves. Such dispensers also include an ice retaining bin having an ice dispensing mechanism for delivering ice on demand into the cup or receptacle. A bin cover is removable from an upper opening to the ice bin to permit manual filling of the bin. In the absence of an icemaker being associated with the ice/beverage dispenser, filling is accomplished by manually lifting and emptying buckets of ice into the bin until it is sufficiently full.

To eliminate difficulties associated with manually filling an ice bin, it is known to mount an icemaker above an ice/beverage dispenser, so that as ice is automatically made it drops directly from the icemaker into the ice bin. However, the particular icemaker selected for mounting on top of an ice/beverage dispenser can be from one of a number of different manufacturers having various and differently dimensioned footprints that may or may not accommodate direct mounting of the icemaker on top of a given ice/beverage dispenser. In addition, because icemakers are manufactured as separate units from ice/beverage dispensing machines, the cost of the two units as mechanically combined with the icemaker atop the ice/beverage dispenser is greater than if an ice/beverage dispenser and an icemaker were manufactured as a single unit. Further, cooling is required in an icemaker to form ice and in an ice/beverage dispenser to cool water for being dispensed into beverages. If one mechanical cooling system were used for both functions, ice-building and water chilling, that would leverage the capabilities of a combined unit in a cost effective manner. One obvious benefit would be the ability to downsize a cold plate of the ice/beverage dispenser, because water-chilling circuits could be eliminated from the cold plate. At the same time, a more compact, less complicated and lower cost cold plate would result. It would therefore be desirable to have a combined ice and beverage dispensing machine with an integral ice making capacity that provides gains in efficiency of operation and a lower total overall cost.

Ice/beverage dispensers require that water be chilled for dispensing into beverages, which typically is accomplished by flowing water through a cold plate that is in heat exchange contact with ice produced by an icemaker. The process of using an icemaker to produce ice that is then placed in heat exchange relationship with the cold plate to take up heat from the cold plate is thermally and energy inefficient. A typical cube type icemaker evaporator has one side configured and dedicated to molding ice cubes while an opposite side contains the required refrigerant lines that produce the necessary cooling for removing heat from water flowing over the one side in order to freeze the water and build ice cubes. In this configuration, only half of the available surface area presented by the evaporator structure is used to exchange heat and produce ice. Physical constraints, cost and complexity dictate this arrangement where, as conventional, the icemaker is separate from the ice/beverage dispenser. It would be desirable to use the other side of the icemaker evaporator, opposite from the ice cube freezing side, to chill water for use in dispensed beverages.

Both ice/beverage dispensers and icemakers require drain, water supply and electrical connections. When an icemaker is mounted on top of an ice/beverage dispenser, separate drain, water and electrical connections are commonly provided to each. The cost of making such separate connections to each machine is expensive and tedious. It would be desirable to have each of the ice/beverage dispenser and icemaker share common drain, water and electrical connections.

OBJECT OF THE INVENTION

An object of the present invention is to provide a combined ice and beverage dispensing machine with an integral ice making capacity that provides gains in efficiency of operation and a lower total overall cost.

Another object of the invention is to provide such a combined icemaker and ice/beverage dispenser in which the icemaker has an evaporator for building ice and in which the evaporator is also used to chill water for dispensing into beverages A further object of the invention is to provide a combined icemaker and ice/beverage dispenser which share common drain, water and electrical connections.

SUMMARY OF THE INVENTION

The present invention is an ice/beverage dispensing machine having an integral ice making capacity. The ice making and beverage dispensing portions of the machine include a shared evaporator that accomplishes both the cooling of the beverage water component as well as the making of ice. An advantage of this approach is that since a cold plate is typically used to cool both the beverage water and a syrup flavoring beverage component, by cooling the beverage water with the evaporator the cold plate can be made much smaller as it only needs to cool the syrup flavorings. Advantages of the arrangement are that any reductions in cold plate size and complexity will greatly reduce the cost of a dispenser and increased evaporator efficiencies are obtained through use of both sides of the evaporator.

More particularly, in accordance with the invention an apparatus for dispensing ice and beverage and for making ice comprises an ice making portion including a compressor, a condenser, an evaporator, a sump below the evaporator for containing water for circulation over the evaporator and for receiving water off of the evaporator during circulation thereof, and a water pump for circulating water from the sump over the evaporator. Also included is an ice and beverage dispensing portion including an ice retaining bin, a plurality of beverage dispensing valves, and a carbonator including a carbonator tank and a carbonator pump having an inlet coupled to water in the sump and an outlet coupled to an inlet to the carbonator tank for delivering water from the sump to the carbonator tank. Means are included for providing fluid and electrical connections to the ice making portion and to the ice and beverage dispensing portion, and also included is control means for controlling operation of the ice making portion and the ice and beverage dispensing portion. In a preferred embodiment the evaporator comprises an evaporator refrigerant coil, an ice piece forming panel on one side of the coil and a water chilling plate on an opposite side of the coil, and the ice making portion includes means for selectively directing water from the water pump either onto the ice piece forming panel of the evaporator when it is desired to make ice or onto both the ice piece forming panel and the water chilling plate of the evaporator when it is desired to efficiently chill water for beverages. Advantageously, the compressor is a variable speed compressor that can be controlled in such manner as to maintain the evaporator at temperatures considered appropriate for each of the ice making and water chilling functions of the evaporator.

To facilitate interconnection of the ice making and the ice and beverage dispensing portions, the apparatus may include a tray between the ice making portion and the ice and beverage dispensing portion, which tray carries a drain fitting for coupling inline with a drain line extending from a sump drain opening to a drain and a water supply fitting for coupling inline with a supply line extending between a sump water outlet and the inlet to the carbonator pump.

The ice making portion and the ice and beverage dispensing portions are desirably contained in a single housing, and to facilitate access to the ice making portion, a shelf may be slidably attached to the housing and the ice making portion may be mounted on the shelf to accommodate sliding of the ice making portion out of the housing more convenient servicing, repair or replacement of the same.

The invention also contemplates a method of operating a combination icemaker and ice and beverage dispenser, wherein the icemaker includes a compressor, an evaporator, and a sump below the evaporator for containing water for circulation over the evaporator and for receiving water off of the evaporator during circulation thereof, and wherein the ice and beverage dispenser includes an ice retaining bin and a plurality of beverage dispensing valves coupled to the sump for receiving water therefrom. The method comprises the steps of selectively operating the ice maker to perform either an ice making cycle or a water chilling cycle. In performing an ice making cycle, the method contemplates circulating water from the sump over the evaporator while operating the compressor to freeze the water on the evaporator, and subsequently hot gas harvesting the ice on the evaporator and delivering the harvested ice to the ice retaining bin. In performing the water chilling cycle, the method contemplates circulating water from the sump over the evaporator while operating the compressor to chill, but not freeze, the water on the evaporator, thereby to chill the water in the sump and received by the beverage dispensing valves.

The foregoing and other objects, advantages and features of the invention will become apparent upon a consideration of the following description thereof, when taken in conjunction with the accompanying drawings.

BRIEF DESCRIPTION OF THE DRAWINGS

FIG. 4A is a view of an ice cube forming panel on one side of the evaporator;

FIG. 4B is a view of a beverage water cooling plate on an opposite side of the evaporator;

DETAILED DESCRIPTION

Figure 1:
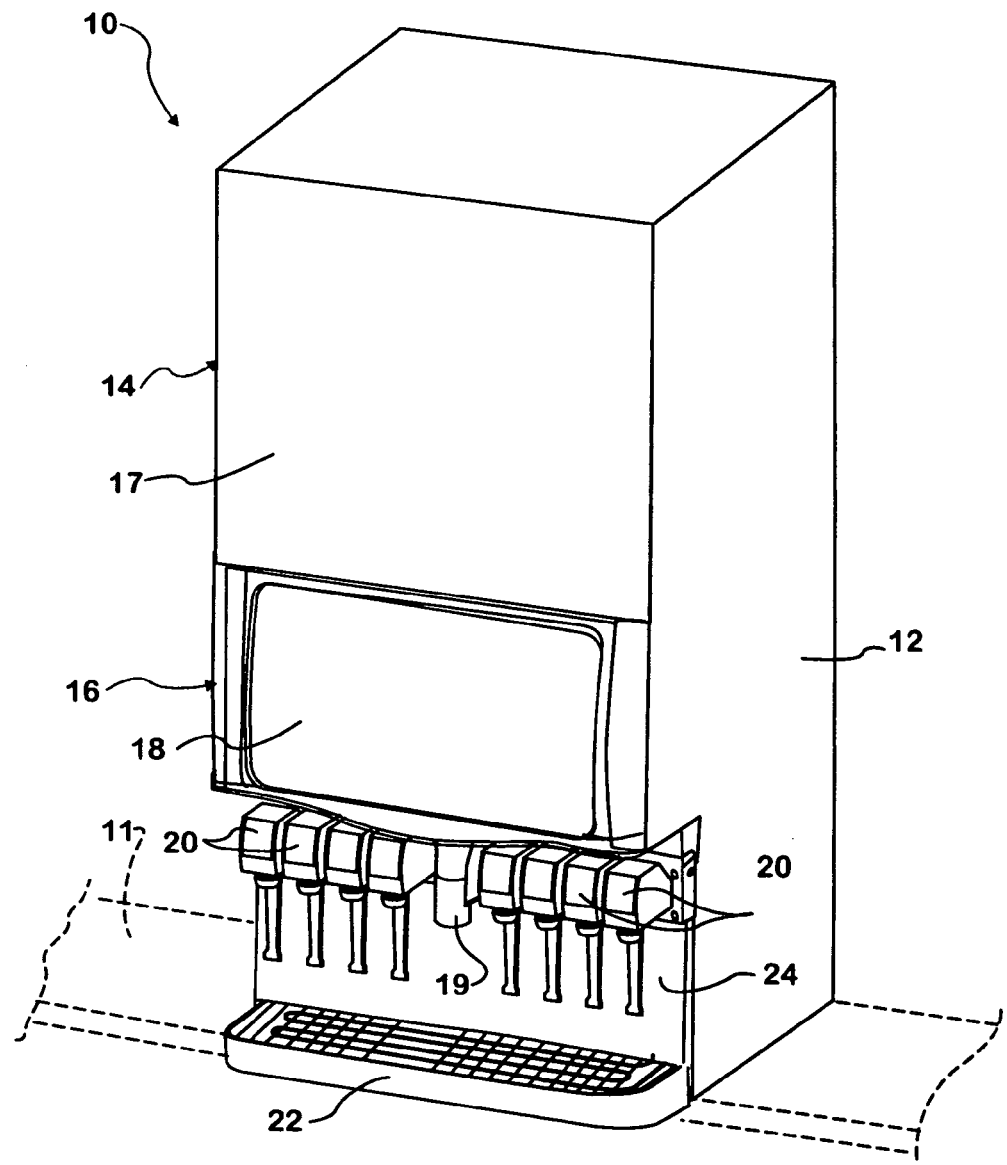
FIG. 1 is a perspective view of a combined icemaker and ice/beverage dispenser machine according to the present invention.

The invention combines into a single machine an icemaker and an ice/beverage dispenser, such that an ice/beverage dispenser is provided with an ice making capacity. Since both an icemaker and an ice/beverage dispenser require cooling, benefits obtained include using a mechanical refrigeration system of the icemaker to both build ice and chill water for dispensing in beverages. Using the mechanical cooling system for both ice-building and water chilling functions leverages the capabilities of the machine in a cost effective manner. One benefit is the ability to downsize a cold plate of the ice/beverage dispenser through elimination of water-chilling circuits, resulting in a more compact, less complicated and lower cost cold plate.

Another advantage to using a single mechanical cooling system to serve the purposes of both ice-making and water chilling is that the arrangement allows the compressor to perform double duty, requiring it to run more continuously. This reduces the number of starts/stops of the compressor, leading to a decrease in wear and tear on the compressor and increased service life. In addition, variable speed technology can advantageously be employed to allow for relatively precise matching of compressor capacity to ice-making and water chilling needs.

Dedicated icemakers currently make use of one side only of plate-type evaporator designs to build ice cubes. The invention, on the other hand, contemplates that an icemaker evaporator serves the dual purpose of also being used as a water chiller. So that the evaporator might more efficiently serve double duty, a water chilling plate is provided on an opposite side of the evaporator, opposite from an ice building plate, and water is sprayed onto both sides of the evaporator, doubling its effective water cooling surface area and significantly increasing the saturated evaporator temperature, thereby increasing cooling capacity. Water is recirculated from a collection pan or sump located below the evaporator to the top of the evaporator plates for chilling as it flows down the plates and back into the sump. With the evaporator serving double duty as both an ice-maker and a water chiller, the sump is enlarged to be of sufficient size to minimize the tendency for a fixed displacement compressor to cycle on/off. The sump should be large enough to accommodate a time interval of anywhere from 1 to 5 minutes of "on" time of the compressor for a water chiller function, while ice-making normally occurs over a 12 to 15 minute compressor operating cycle. Should there be a demand for both ice-making and water chilling, a control system prioritizes the functions in such manner as to meet demand for both dispensed drinks and ice building. In an extreme case an ice bin might run out of dispensable ice or ice to supply to a cold plate to chill to beverage syrups flowing through cold plate circuits, but that would simply mean that cold water would be mixed with room ambient syrups for a drink that is not compromised too much.

An estimate is made of maximum demand to be placed on the icemaker. For example, if a drink specification of 4×12 oz drinks per minute for up to 120 drinks is assumed, that can be used to set the maximum consumption rate for cold drinks during periods of peak demand. A particular ice production rate would then set the remainder of the demand for mechanical cooling. Maximum demand could be based upon that which might be expected in a store setting, and an icemaker compressor of variable speed capability can advantageously be used to match system cooling capacity to variations in ice consumption and beverage cooling needs.

Combining an icemaker and an ice/beverage dispenser and utilizing the icemaker evaporator in the foregoing described manners yields energy savings over the conventional practice of having separate ice-making and water chilling functions. The compressor in the ice-making mode consumes more energy than when used to chill water. That means that the energy required to chill the water directly with a mechanical cooling system is less than would be required to make ice for a cold plate. The difference is a result of the saturated evaporating temperature that the compressor will see during ice making, which may be close to 0° F. for ice making, but is closer to 20° F. for water chilling.

Referring to the drawings, a combined ice making and ice and beverage dispensing machine of the present invention is seen in FIG. 1 and indicated generally at 10. The dispenser 10 is designed to rest on a countertop 11 or other suitable surface and includes an outer housing 12 that encloses an upper ice making portion 14 and a lower ice and beverage dispensing portion 16 of the dispenser. The ice making portion 14 includes a removable front panel 17 and the dispensing portion 16 includes a merchandising cover 18, an ice dispensing chute 19, a plurality of post-mix beverage dispensing valves 20, a drip tray 22 and a splash panel 24.

As seen in FIGS. 2–4, 4A, 4B, 6 and 9, the upper ice making portion 14 includes a refrigeration system having a compressor 26, a condenser 28 and an ice making and water cooling evaporator, indicated generally at 30. The evaporator 30 includes on one side an ice cube forming panel 32 having a plurality of cubic recesses 32a and on an opposite side a water cooler consisting of a flat metal plate 34. An evaporator refrigerant coil 36 extends between and in intimate heat exchange contact with the ice cube forming panel 32 and the water cooling plate 34. As is conventional, a harvest indicating curtain 38 is pivotally coupled to and extends over the ice cube forming panel 32 for being moved and pivoted clockwise (as viewed in FIG. 3) by ice falling off of the panel during an ice harvest cycle to indicate that ice has been successfully harvested. A water holding pan or sump 40 is positioned below the evaporator 30 and includes a partial top cover 40a having an opening 40b that is located directly below the evaporator. A valve 42 regulates filling of the sump 40 with potable water from a water supply line 43 and a pump 44 circulates water from the sump to a pair of elongate water distribution tubes 46a and 46b. The tube 46a is positioned above and along the ice cube forming panel 32 and the tube 46b is positioned above and along the beverage water chilling plate 34. Each tube is provided with a plurality of water outlet holes 47 in linear spaced relationship along the lengths of the tubes for emitting water for distribution over the surfaces of the ice cube forming panel 32 and the water cooling plate 34. A valve 48 controls delivery of water to the distribution tube 46b and a valve 49 regulates removal of water from the sump 40 through a drain line 49a. A divider panel 50 isolates the sump 40 from air circulation around the compressor 26 and the condenser 28. The foregoing components are all carried on a deck 52 that is received along opposite edges in slides 54 fastened to inside surfaces of the housing 12.

Figure 3:
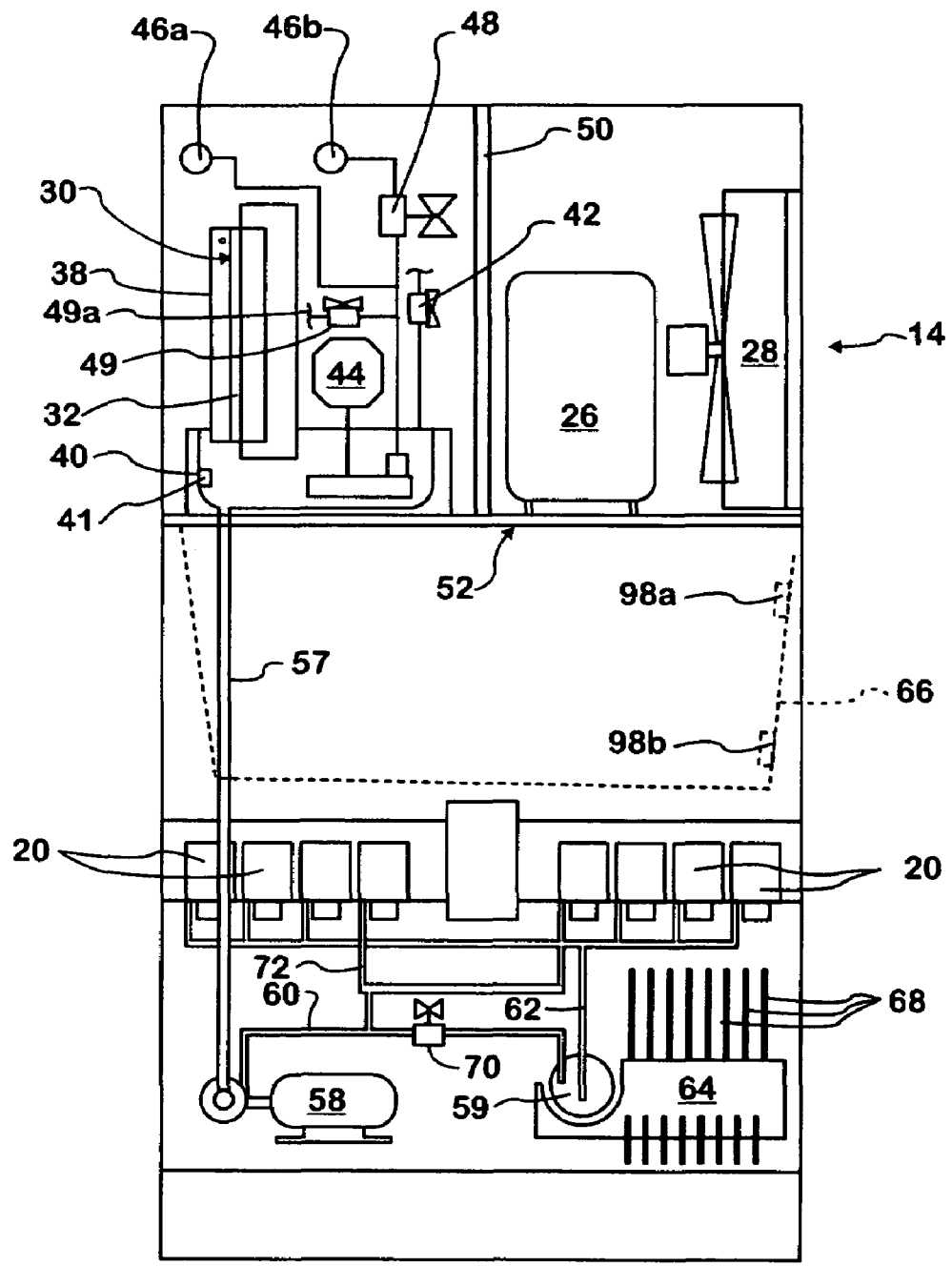
FIG. 3 is a schematic view of the combination machine.
Figure 4:
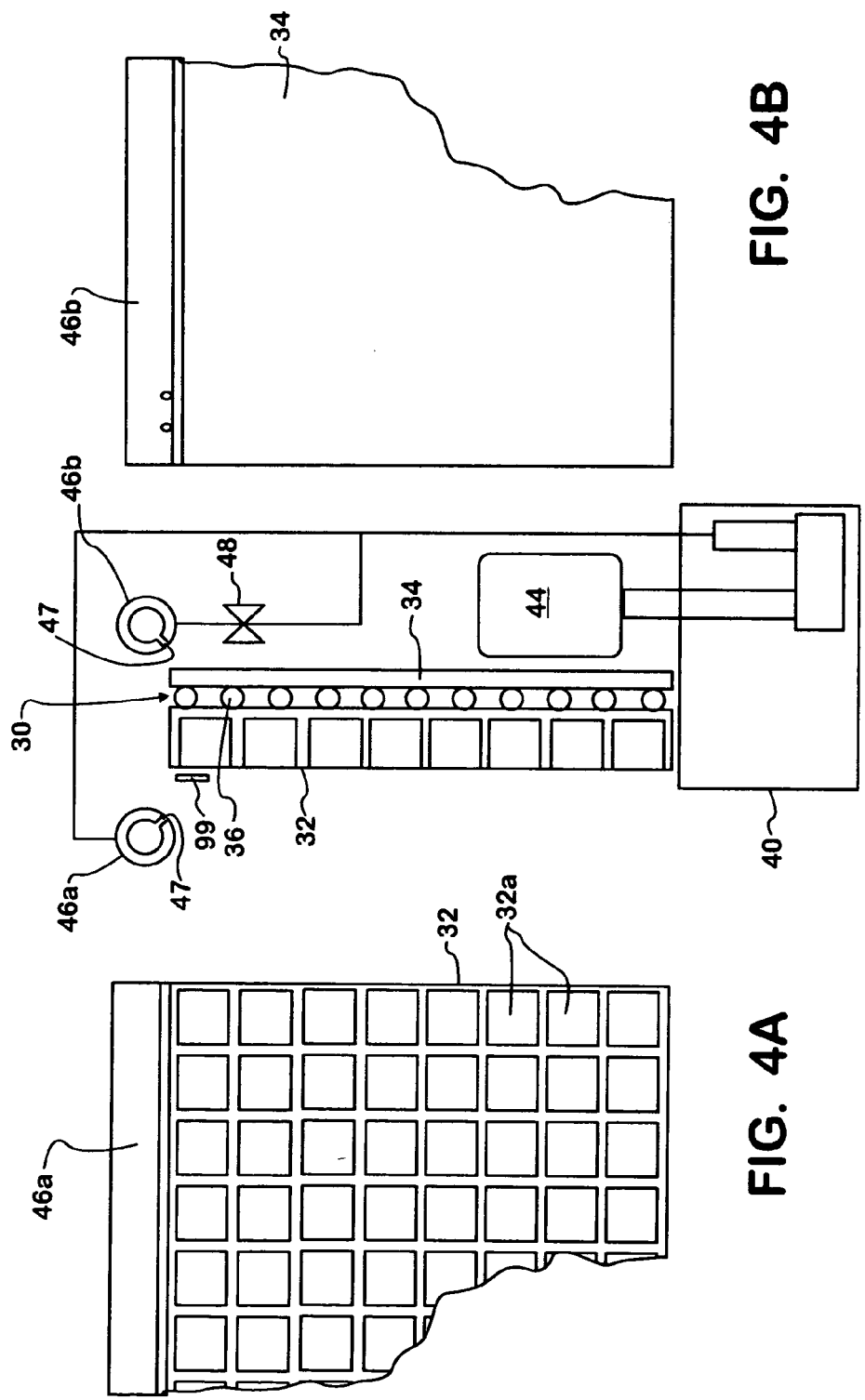
FIG. 4 is a schematic view of a two sided evaporator, a sump for servicing the evaporator and related components of the combination machine.
Figure 9:
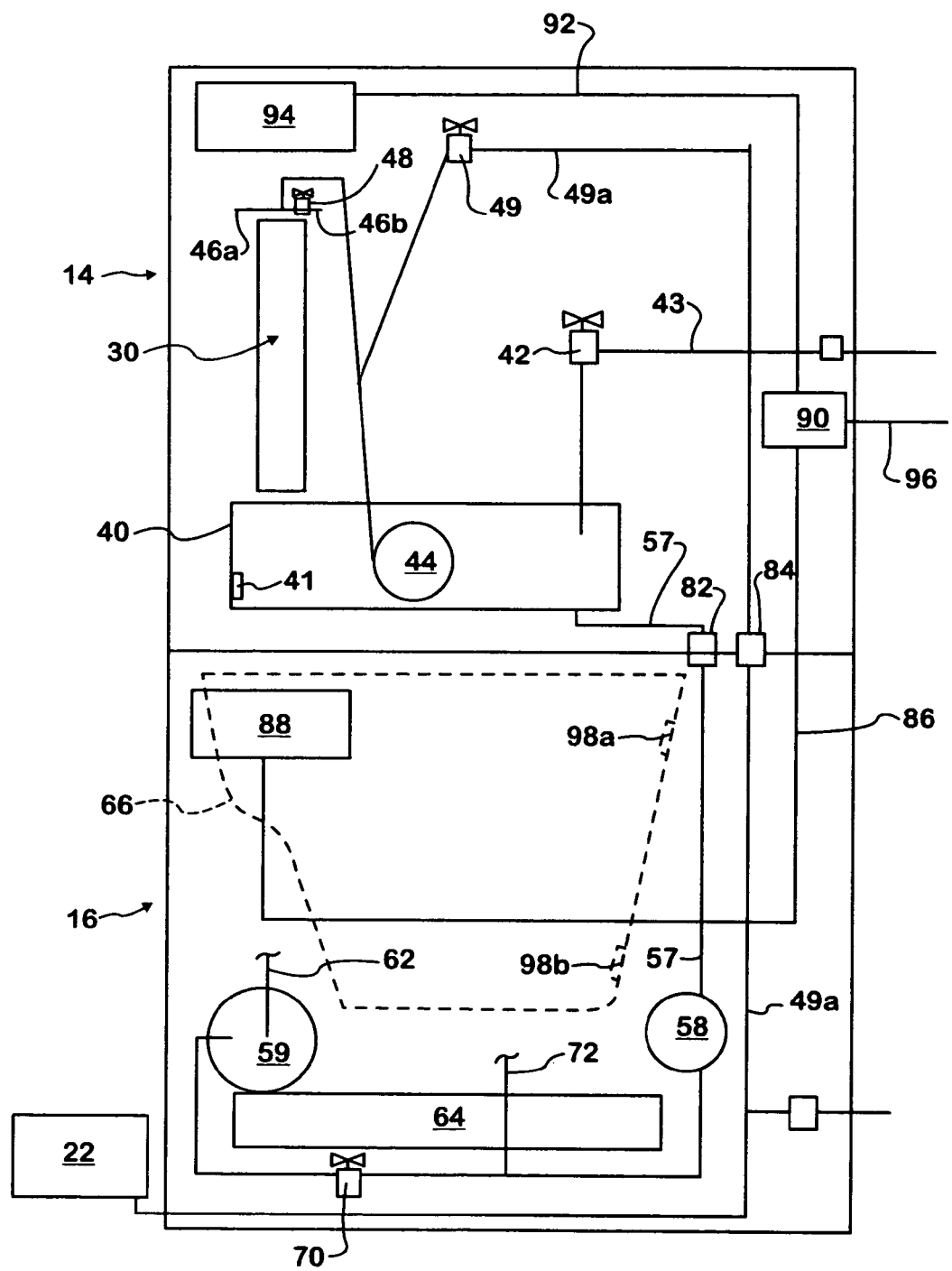
FIG. 9 is a schematic representation of the combination machine.

As seen in FIG. 3, a fluid line 57 connects the sump 40 with a carbonator pump 58. The pump 58 also connects to a carbonator 59 through a fluid line 60. Carbonated water is produced in the carbonator 59 in a conventional manner and is delivered to the beverage dispensing valves 20 through fluid lines 62. So that chilled carbonated water might be delivered by the carbonator to the beverage dispensing valves, the carbonator is preferably supported in heat exchange contact with a cold plate 64. As also seen in FIG. 9, the dispenser 10 includes an ice retaining hopper or bin 66 located in the lower ice and beverage dispensing portion 16 above the cold plate 64 and below the ice piece forming panel 32 for receiving ice produced by the panel and gravitationally conveyed to the ice bin during an ice harvest cycle. The ice bin 66 has a lower opening (not shown) that accommodates gravity passage of ice from the ice bin to, onto and into heat exchange contact with the cold plate 64. In this manner, ice from the ice bin 66 automatically falls down onto and cools the cold plate 64, so that the cold plate then cools beverage syrup flavoring flowing through a plurality of circuits or lines 68 embedded in the cold plate. Upon exiting the cold plate, the lines 68 connect to the valves 20 to deliver chilled beverage syrup flavorings to the valves. A valve 70 regulates delivery of water by the pump 58 to the carbonator 59, and one or more water diverting lines 72 are optionally provided to deliver noncarbonated plain water to a selected one or more of the valves 20, for example to two valves (FIG. 3) for use in dispensing beverages that use plain water in mixture with their respective concentrate flavoring syrup.

As seen in FIGS. 6–9, the dispenser 10 includes a system for conveniently providing fluid and power connections between the upper ice making portion 14 and the lower ice and beverage dispensing portion 16. The dispensing portion 16 includes a U-shaped tray 80 positioned at a top and back end thereof to which is secured a water drain line barb fitting 82 and a water inlet flare fitting 84 and through which extends a power cord 86. A lower side of the barb fitting 82 provides for quick connection to and disconnection from the drain line 49a and a lower side of the flare fitting 84 provides for quick interconnection with the tube 57 extending between the sump 40 and the carbonator pump 58. The power cord 86 connects at one end to an electrical box 88 of the dispenser portion 16 and at an opposite end to a power junction box 90. A further power cord 92 extends from the junction box 90 and provides power to a power and control box 94 of the ice making portion 14. A power supply cord 96 connects the junction box 90 to an outside electrical power source.

A processor based electronic control for the dispenser 10 is located in the junction box 94 and controls operation of various components of the dispenser, including all of the various valves and pumps as well as the compressor 26. The dispenser 10 operates to make ice in a conventional manner, in that water is circulated over the ice cube making panel 32 of the evaporator 30 by the pump 44 while the evaporator is cooled by operation of the compressor 26 of the refrigeration system to freeze the water and build ice on the ice making panel. Ice is harvested when a sensor 99 detects that ice on the panel 32 is of sufficient thickness. Harvest of the ice is effected by a hot gas defrost of the evaporator tube 36, so that the ice is released from the panel 32 for gravity conveyance into the ice retaining bin 66. As ice falls off of the panel it contacts and moves or pivots the harvest indicating curtain 38 to an open position. As is understood, as the curtain 38 swings back to its resting position upon completion of ice harvesting a switch (not shown) closes to signal to the control circuit that a further ice making cycle can commence. One or more sensors, such as an upper sensor 98a and a lower sensor 98b, can be used to detect the level of ice in the ice bin 66 by detecting the presence or absence of ice at the sensor, such that the control circuit is responsive to the sensed level of ice in the bin to either be enabled to make ice if the sensed level of ice is low or to stop making ice if the sensed level is high.

The described ice making process is standard in the art. In improving upon the standard process, and as mentioned, the invention provides an ability to use the same mechanical refrigeration system used in ice-making to also chill water used in dispensed beverages. This is advantageously accomplished by flowing water from the sump 40 over both the ice cube forming panel 32 as well as the flat metal water chilling plate 34 of the evaporator 30 while the compressor 26 operates to chill the evaporator refrigerant coil 36. To provide the water flow to the evaporator, the pump 44 is operated to flow water from the sump 40 to and out of the water distribution tube 46a and across the ice cube forming panel 32 and the valve 48 is opened to flow water provided to and out of the water distribution tube 46b and across the flat metal water chilling plate 34. The water chilled by the mechanical refrigeration system as it flows across opposite sides of the evaporator is returned to the sump 40 from which it is withdrawn, as needed, by the action of the carbonator pump 58 to provide either non-carbonated water or to produce carbonated water that are used as diluents and mixed with concentrated syrup flavorings in dispensed beverages.

Control of the operation of the dispensing system 10 of the present invention is predicated upon criteria that determine when ice is to be made and when water is to be chilled. Lower and upper control temperature setpoints are selected for water in the sump 40, the temperature of which is detected by a sensor 41. When water temperature rises to a user adjustable upper setpoint, say 38° F., a switch is made from ice building to water chilling. While in the water chilling mode, the average temperature of water in the sump 40 should drop at a reasonable rate, so that ice building can resume. However, care must be taken to avoid freezing the water in the sump, so a lower setpoint cut-out temperature above freezing is selected for the water in the sump, say 34° F., at which point the water chilling function ends and any necessary ice building continues.

The sump 40 must be sufficiently sized relative to the size of the carbonator tank 59 to be able to meet demands for chilled water. Every time the carbonator pump 58 draws a differential volume of water from the chilled water sump 40, warm replacement water enters the sump and elevates the temperature of the water in the sump. If drinks are drawn at an assumed rate of 4×12 oz drinks per minute, the system should not switch to water chilling mode after just one drink is dispensed, but it would be acceptable for the system to switch to water chilling mode toward the end of the second drink. Based upon that criterion, the capacity of the water sump 40 should be approximately 21.3 times the differential volume over which the carbonator tank 59 operates. If the carbonator tank is designed so that when 18 oz of carbonated water has been drawn from it the carbonator pump 58 will turn on and refill the carbonator tank, then the sump size or capacity would be 3.0 gal or 384 oz. The temperature of the water in the sump 40 will rise each time the carbonator pump comes on by an amount determined by the temperature of the incoming replacement water and the volume of water withdrawn from the sump by the carbonator pump, and if the size of the sump is too small the jump in temperature will become significant, being roughly inversely proportional to a reduction in size of the sump.

As drinks are drawn from the dispenser 10, water flowing into the sump 40 to replace that which is withdrawn causes the temperature of the water in the sump to rise until it reaches the upper setpoint temperature. When this occurs, and subject to the stage of the then ongoing ice-making cycle, the processor based control circuit to operate the mechanical refrigeration system to turn on the pump 44 and to open the valve 48 to supply water from the sump to and across opposite sides of the evaporator 30 to chill the water in the sump. Two variables determine the rate at which the temperature of the water in the sump drops: first, the size of the sump (a greater capacity slows the rate of temperature drop) and, second, the capacity of the compressor (a larger capacity increases the rate of temperature decline). This relationship should be controlled, and it has been estimated that a compressor capacity in the range of about 9,350 to 13,200 Btu/hr should be proper for a sump capacity on the order of about 3.0 gallons. With the foregoing relationship, a decline in sump water temperature during water chilling and when no drinks are being drawn will be approximately 6.3° F. per minute. Should the carbonator tank repeatedly fill during water chilling the temperature of the water will rise during each carbonator tank filling, but the overall temperature will trend downward. Cooling capacity needs to be sufficient to pull sump water temperature down to the lower setpoint temperature in 1 to 5 minutes. Water chilling takes priority over ice building, so while the sump water temperature remains above the lower cut-out temperature, water chilling will continue and ice building will be prevented from occurring.

To compensate for a wide variety of drinks and drink sizes, it is desirable to return to the ice making mode as soon as practical without short cycling the compressor 26. Advantageously, the compressor 26 is a variable speed compressor, which can be controlled to accomplish the desired quick return to ice-making. Two criteria may be used to determine if the compressor is running with sufficient capacity. First, if drinks are not being drawn, during water chilling the temperature of water in the sump 40 should be dropping at a rate of between 5 and 10° F. per minute. If not, the compressor speed can be incremented upward, perhaps by about 10%. Second, if drinks are being drawn a rolling average of 12 readings, one every 5 seconds over a period of 60 seconds, can be used to establish a temperature trend line. The trend line should show that the temperature is decreasing at a rate of at least about 0.7° per minute. If it is not or is trending upward, a more significant increase in compressor speed, perhaps by about 20%, can be made. The results of compressor speed changes are not sensed immediately, so it is contemplated that time be allowed following compressor speed adjustments for changes to be seen, perhaps up to 60 seconds, before any further adjustment is made. It is understood that compressor speed adjustments can also be made in the opposite direction to decrease compressor speed.

Figure 5:
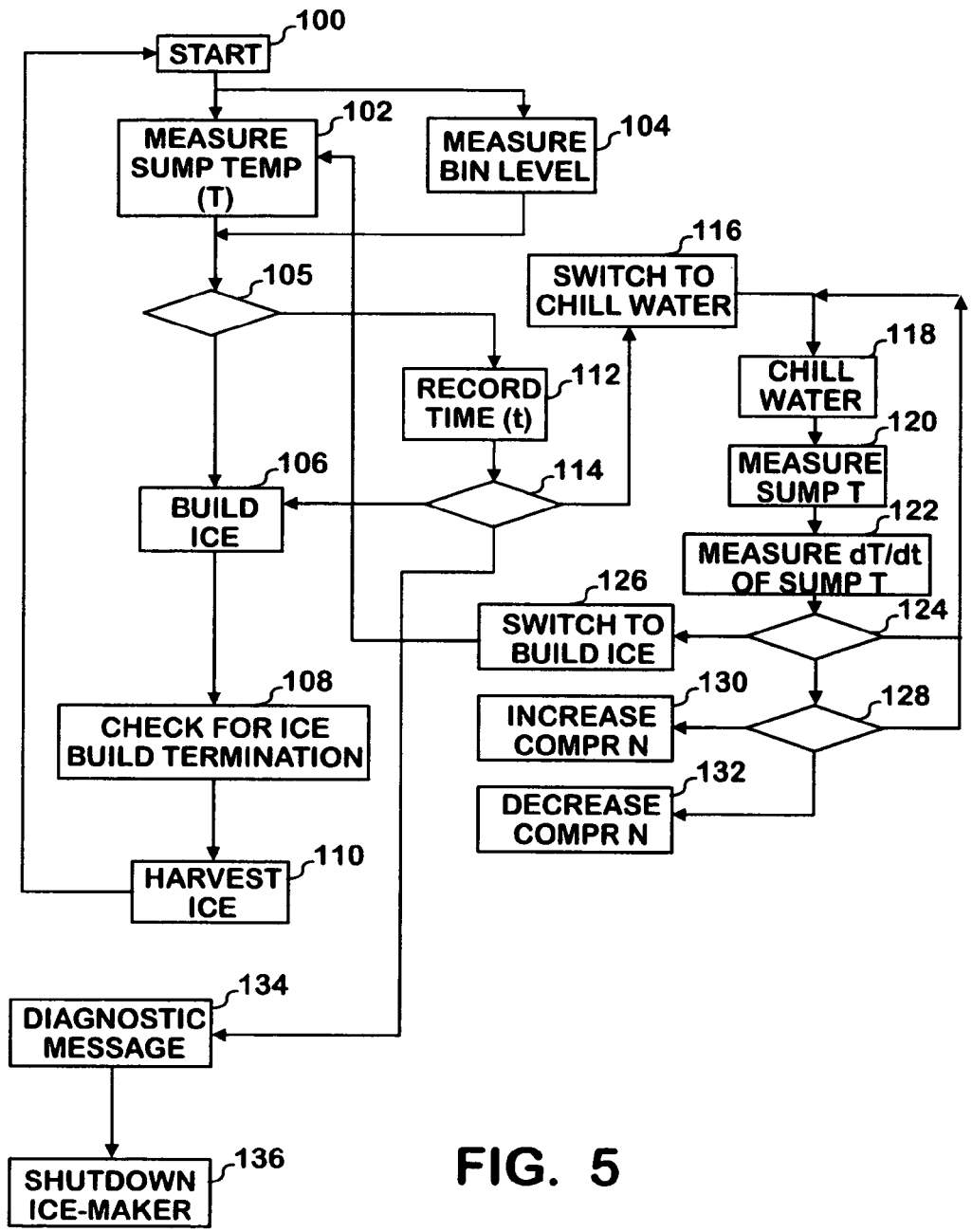
FIG. 5 is a flow diagram of the control logic of the combination machine.
Figure 6:
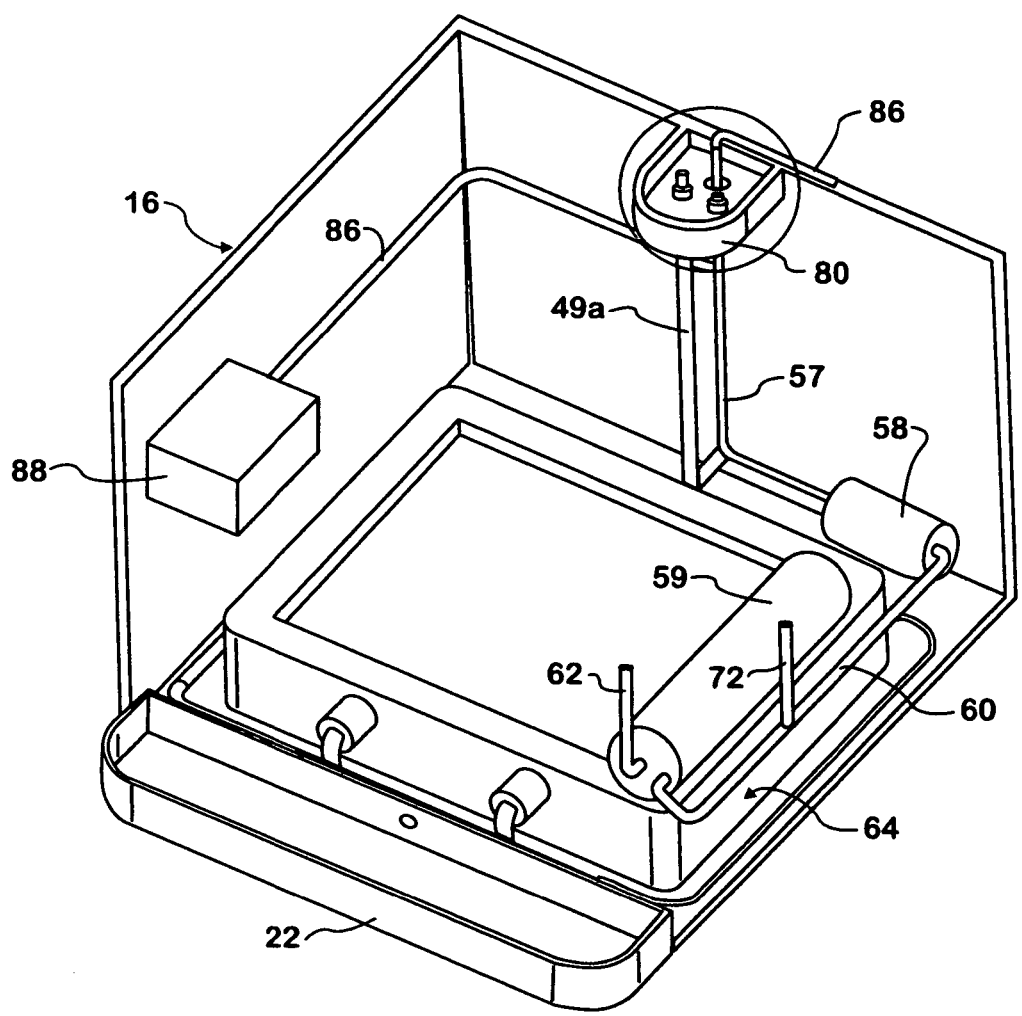
FIG. 6 is a cutaway perspective view of a portion of a cold plate compartment of the ice/beverage dispenser of the combination machine.
Figure 7:
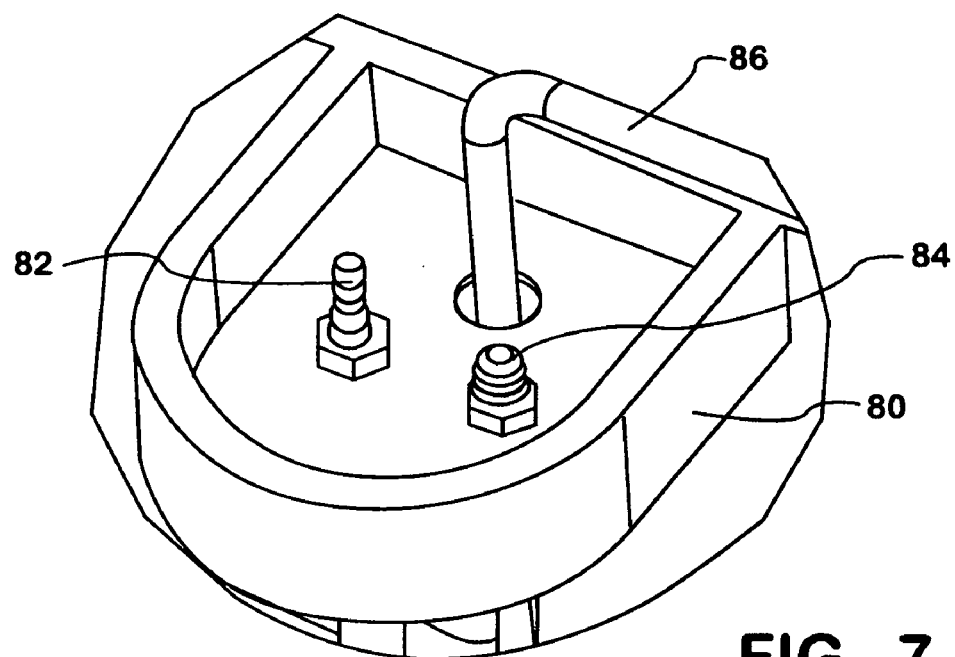
FIG. 7 is an enlarged perspective view of a circled area of FIG. 6, showing a U-shaped tray.
Figure 8:
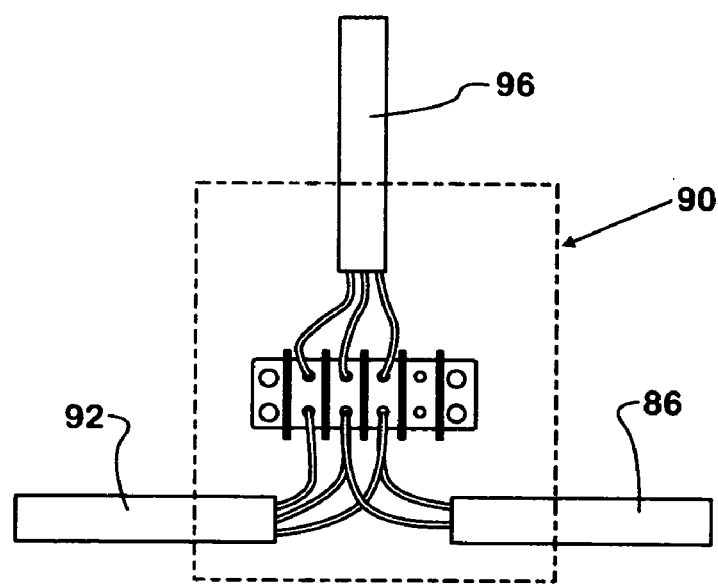
FIG. 8 is an enlarged plan view of an electrical junction box of the combination machine.

The control circuit in the junction box 94 responds to sump water temperature information and ice bin ice level information. Referring to the flow diagram of FIG. 5 and commencing at start block 100, the control circuit first determines at block 102 the temperature of water in the sump 40 as detected by the sensor 41 and at block 104 the level of ice in the ice bin 66 as detected by the ice level sensors 98a and 98b. If at block 105 the sensed temperature of water in the sump 40 is below a predetermined upper setpoint temperature and the sensed level of ice in the ice bin ice indicates that more ice is needed, then at block 106 an ice making cycle is commenced. The ice sensor 99 is checked at block 108 and if ice on the evaporator 30 is ready for harvest, a hot refrigerant gas ice harvest is initiated at block 110. Upon completion of the ice harvest cycle return is made to block 100.

If at block 102 the sensed temperature of the water in the sump 40 is at least equal to the upper setpoint temperature, then irrespective of the sensed level of ice in the ice bin at block 104, at block 105 it is determined that the temperature of water in the sump 40 must be lowered, as the water is not sufficiently cold to be mixed with syrup and produce a drink of a desired low temperature. Under this circumstance, where the sump water temperature is at least equal to the upper setpoint temperature (e.g., 38° F.), then at block 112 the time elapsed from initiation of the current ice making cycle is determined. If at block 114 the time elapsed since the current ice-making cycle began is less than a predetermined minimum time required to initiate a minimum ice formation level on the ice panel 32, which minimum time may be on the order of 2–3 minutes, then the ice making cycle in progress is not interrupted. In other words, if the refrigeration system is less than about three minutes into the ice building cycle, ice of at least a minimum sufficient thickness will not have formed on the ice panel 32 and ice building is allowed to continue. When the minimal sufficient thickness of ice on the ice panel 32 is reached, as determined at block 112 by the refrigeration system being in the current ice-making cycle for at least the predetermined minimum time, at block 116 the refrigeration system is switched to water chilling mode, wherein both sides of the evaporator 30 are used for the purpose of water chilling in order to decrease the temperature of water in the sump 40. The reason for waiting for the refrigeration system to be at least the predetermined minimum time into the current ice-making cycle, before switching to water chilling, is because if ice being formed on the ice panel 32 is not of at least a minimum sufficient thickness, the efficiency of the refrigeration system in water chilling mode will decrease.

On the other hand, if the time elapsed in the ice-making cycle is greater than the predetermined minimum time required for ice building to be well-initiated, then priority can be given to determining whether cooling of the water in sump 40 can be immediately commenced. This determination is made based upon the time recorded at block 112, and if the time recorded is determined at block 114 to be at least a predetermined maximum time that is long enough that the current ice-making cycle is well underway, then the ice-making cycle is allowed to proceed to harvesting of ice. However, if the recorded time is determined at block 114 to be greater than the minimum predetermined time but less than the maximum predetermined time, then ice-making is interrupted and water chilling is begun. Thus, three ice building time periods are considered at block 114: a minimum time period beginning at commencement of the current ice-making cycle and ending at the predetermined minimum time and during which ice building is allowed to continue; a midrange time period extending from the predetermined minimum time to the predetermined maximum time and during which water chilling can be immediately commenced, and a maximum time period beginning at the predetermined maximum time and during which ice-making is allowed to continue to harvest. For example, if the midrange time period beginning with initiation of the current ice-making cycle is established to be on the order of between 3 and 9 minutes, then should the time period determined at block 114 be less than 3 minutes, ice building is allowed to continue until 3 minutes is reached before water chilling begins; should the time period be between 3 and 9 minutes, water chilling is immediately commenced, and should the time period be at least 9 minutes, then ice harvest should be imminent and the ice making cycle is allowed to continue to conclusion. However, if the time recorded at block 112 and determined at block 114 is greater than 20 minutes, it is an indication that there may be something wrong with the ice-making cycle, in which case a diagnostic message is given at block 134 and an icemaker shut down is effected at block 136.

If the time recorded at block 112 is in the midrange, then at decision block 114 the control system moves to block 116 and switches to a water chilling cycle and at block 118 the pump 44 is turned on and the valve 48 is opened to chill the water in the sump 40 by delivering the water to and flowing the water over the ice cube forming panel 32 and the water chilling panel 34 on opposite sides of the evaporator 30 while the refrigeration system is operated to cool the evaporator. This cooling technique uses the evaporator 30 to a higher level of efficiency by substantially doubling its effective heat exchange surface area. While water chilling is occurring, the temperature of water in the sump 40, as detected by the sensor 41, is sensed at block 120 and at block 122 a determination is made of the rate of change of the sump water temperature with respect to time. At block 124 the sensed temperature of the sump water is compared with the lower setpoint temperature, and when the temperature of the water decreases to the lower setpoint temperature, for example to 34° F., the pump 44 is turned off, the valve 48 is closed and at block 126 the ice-making cycle is reinitiated. The lower setpoint temperature for water in the sump 40 is selected to be above 32° F. so that during water chilling the water does not begin to freeze on the water chilling plate 34.

Advantageously, the compressor 26 is of the variable speed type and is controlled to operate at different levels, depending upon the degree of cooling required. In this manner, during ice making the compressor can be controlled to pull the evaporator 35 down to a temperature of around 0° F. while during water chilling the evaporator temperature can be pulled down to only about 25° F. to insure that ice does not form on the water chilling plate 34. At decision block 128 a determination is made whether the temperature of the water in the sump 40 is being reduced at a sufficient rate and if it is not then at block 130 the compressor speed is increased incrementally, for example by 10%. Conversely, if the rate of cooling of the water exceeds a maximum desired rate of temperature decrease, then at block 132 the compressor speed can be decreased incrementally, for example by 10%. The rate of change of sump water temperature with respect to time is thereby maintained in a desired intermediate range.

If the dispenser 10 is to be capable of delivering four twelve ounce drinks per minute for a total of 120 drinks at a desired temperature of below 40° F., that requirement impacts the sizing of the compressor 26 and the evaporator 30 and the size or capacity of the sump 40. It is desirable that the refrigeration system be sized not only to avoid short cycling of the compressor, but also to avoid continuous operation as well. In other words, the refrigeration system should have some built in excess capacity. In a system with a variable speed compressor and an ice making capacity of approximately 500 pounds per day, and given the above stated cold drinks volume capacity, a sump volume of approximately three gallons will be required and a refrigeration system capacity in the range of about 9,350 to 13,200 Btu/hr would be needed. It is understood, of course, that the particular sizing chosen for the various components is dependent upon the performance criteria to be met by the dispenser 10.

Figure 2:
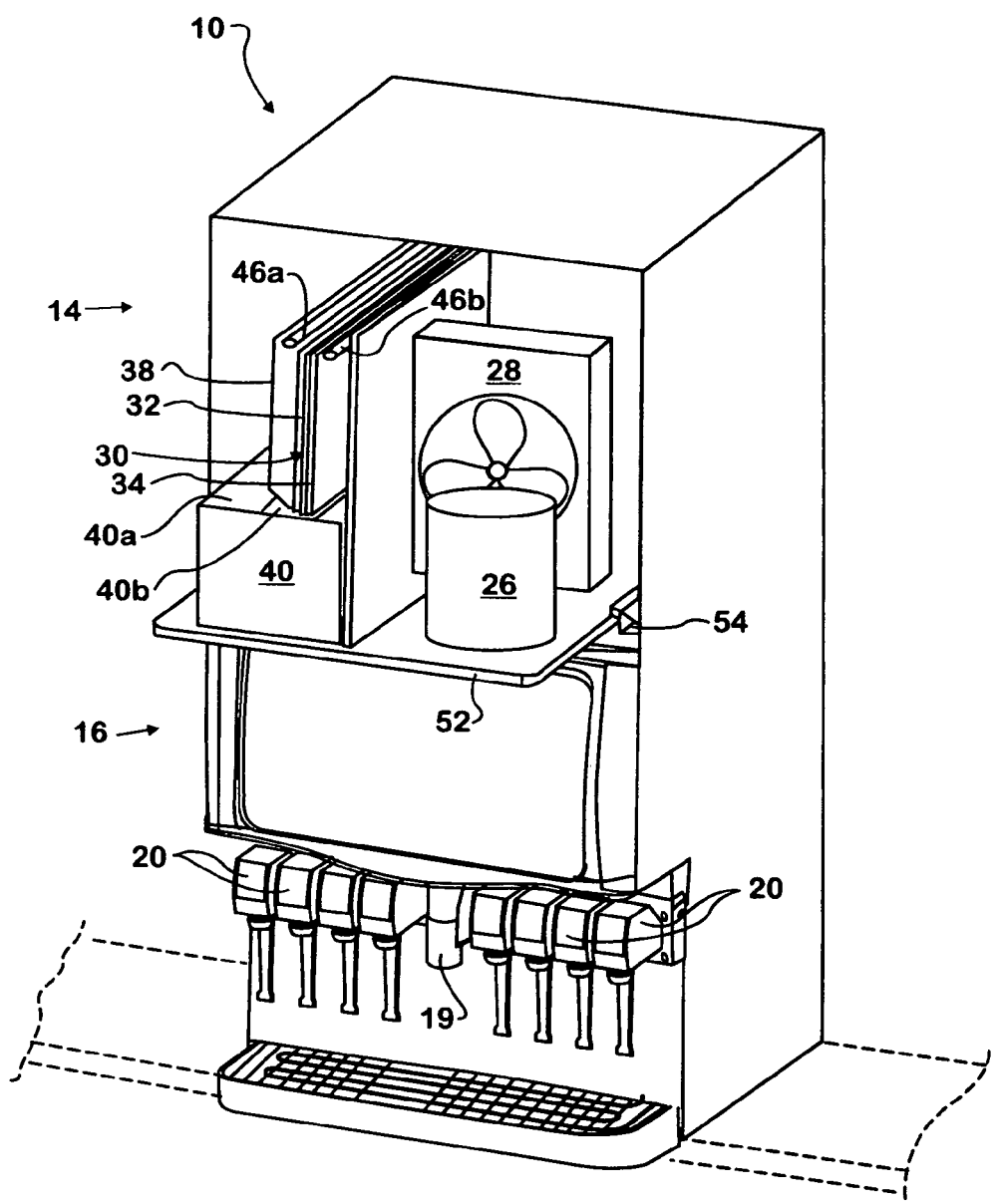
FIG. 2 is a cutaway perspective view of the combination machine of FIG. 1, showing a removable refrigeration system of the machine.

The refrigeration equipment supporting shelf 52 shown in FIG. 2, in combination with the quick disconnect system as seen in FIGS. 6–9, permit efficient removal of the entire ice-making system in the upper ice-making portion 14 of the dispenser 10. Service personnel therefore have the option of removing the ice-making components for service and repair or replacement without also having to remove all or part of the beverage dispensing portion 16. The tray 80 can be positioned at various positions between the upper icemaker portion 14 and the lower beverage dispenser portion 16, as may be desired. The cold water supply line 57 connecting the sump 40 to the carbonator pump 58 and the sump water drain line 49a extending downward from the tray 80 into the lower dispenser beverage portion 16 are adapted to be releasably secured to the fittings 82 and 84, and the tray 80 may be formed as a part of either the upper ice making portion 14 or the dispenser housing 12. The quick disconnect system can be applied to a traditional combination of a separate icemaker and separate beverage dispenser for providing common drain, potable water and electrical line connections. In such a use of the quick disconnect system, the icemaker can be made to include a removable refrigeration component shelf, like the shelf 52, even though it is manufactured as a separate component from the corresponding beverage dispenser to which it is attached. Where the beverage dispenser includes the tray 80 and the icemaker is not designed to work with such a system per se, the icemaker fluid lines can be cut to length or lengthened as need be and connected to the fittings 82 and 84 of the tray 80, and an electrical junction box 90 can be readily added along with a further external power cord.

While embodiments of the invention has been described in detail, various modifications and other embodiments thereof can be devised by one skilled in the art without departing from the spirit and scope of the invention, as defined in the accompanying claims.

What is claimed is:

1. A method of operating a combination icemaker and ice and beverage dispenser, wherein the icemaker includes a compressor, an evaporator having an ice piece forming panel on one side and a water chilling plate on an opposite side, and a sump is below the evaporator for containing water for circulation over the evaporator and for receiving water off of the evaporator during circulation thereof, and wherein the ice and beverage dispenser includes an ice retaining bin and a plurality of beverage dispensing valves coupled to the sump for receiving water therefrom, said method comprising the steps of selectively operating the ice maker to perform either an ice making cycle by circulating water from the sump over the ice piece forming panel of the evaporator while operating the compressor to freeze the water on the ice piece forming panel and subsequently hot gas harvesting the ice on the panel and delivering the harvested ice to the ice retaining bin, or to perform a water chilling cycle by circulating water from the sump over both the ice piece forming panel and the water chilling plate of the evaporator while operating the compressor to chill, but not freeze, the water on the panel and plate and thereby to chill the water in the sump and received by the beverage dispensing valves.

2. A method as in claim 1, including the step, performed in response to said step of delivering water to the ice piece forming panel of the evaporator, of sensing the thickness of ice being formed on the panel, and harvesting the ice when it is formed to a selected thickness.

3. A method as in claim 1, including the steps of sensing the temperature of water in the sump, detecting the level of ice in the ice retaining bin, and in response to a sensed sump water temperature that is less than an upper setpoint temperature and to a detected level of ice in the ice bin that indicates that ice is needed in the bin, performing an ice making cycle.

4. A method as in claim 1, including the steps of sensing the temperature of water in the sump, measuring the duration of any current ice freezing cycle, and in response to a sensed sump water temperature that is at least equal to an upper setpoint temperature and to a duration of a current ice freezing cycle that is greater than a predetermined minimum time and less than a predetermined maximum time, performing a water chilling cycle.

5. A method as in claim 4, including the step of discontinuing performance of the water chilling cycle in response to a sensed sump water temperature that is no greater than a lower setpoint temperature.

6. A method as in claim 1, including the steps of sensing the temperature of water in the sump, measuring the duration of a current ice making cycle, and in response to a sensed sump water temperature that is at least equal to an upper setpoint temperature and to a duration of a current ice freezing cycle that is less than a predetermined minimum time continuing the current ice making cycle until its duration is at least equal to the predetermined minimum time and then interrupting performance of the current ice making cycle and initiating performance of a water chilling cycle.

7. A method as in claim 6, including the step of interrupting the water chilling cycle in response to a sensed sump water temperature that is no greater than a lower setpoint temperature.

8. A method as in claim 1, including the steps of sensing the temperature of water in the sump, measuring the duration of a current ice making cycle, and in response to a sensed sump water temperature that is at least equal to an upper setpoint temperature and to a duration of a current ice making cycle that is at least equal to a predetermined maximum time, continuing to perform the current ice making cycle to completion and then initiating a water chilling cycle.

9. A method as in claim 8, including the step of interrupting the water chilling cycle in response to a sensing a sump water temperature that is no greater than a lower setpoint temperature.

10. A method as in claim 1, including the steps of sensing the temperature of water in the sump, measuring the duration of a current ice making cycle, and in response to a sensed sump water temperature that is at least equal to an upper setpoint temperature and to a duration of a current ice freezing cycle that is at least equal to a predetermined maximum time continuing the current ice making cycle to completion, then initiating a subsequent ice making cycle for at least equal a predetermined minimum time, and then performing a water chilling cycle.

11. A method as in claim 10, including the step of interrupting performance of the water chilling cycle in response to a sensed sump water temperature that is no greater than a lower setpoint temperature.

12. A method as in claim 1, wherein said selectively operating step comprises sensing the temperature of water in the sump, detecting the level of ice in the bin, and in response to said sensing and detecting steps controlling performance of said selectively operating step to perform either an ice making cycle or a water chilling cycle.

13. A method as in claim 12, wherein said step of selectively operating the icemaker is responsive to a sensed sump water temperature that is greater than an upper setpoint temperature to perform a water chilling cycle.

14. A method as in claim 12, including the steps, performed in response to a sensed sump water temperature that is greater than an upper setpoint temperature, of measuring the duration of any current ice freezing cycle and, if the measured duration of the current ice making cycle is at least equal to a maximum predetermined time continuing the current ice freezing cycle, determining when sufficient ice has frozen onto the evaporator ice piece forming panel and interrupting the current ice freezing cycle in response thereto, performing said step of harvesting the ice from the evaporator, initiating a subseqent ice making cycle, terminating the subsequent ice making cycle when its duration is at least equal to a predetermined minimum time, and then performing said water chilling cycle.

15. A method as in claim 12, wherein the compressor is a variable speed compressor, and including the steps of determining the sensed rate of change of sump water temperature with respect to time (DT/dt) and increasing the speed of operation of the compressor to lower the temperature of the evaporator if DT/dt is less than a first value.

16. A method as in claim 12, wherein the compressor is a variable speed compressor, and including the steps of determining the sensed rate of change of sump water temperature with respect to time (DT/dt) and decreasing the speed of operation of the compressor to raise the temperature of the evaporator if DT/dt is greater than a second value.

17. A method of operating a combination icemaker and ice and beverage dispenser, wherein the icemaker includes a compressor and an evaporator and a sump below the evaporator for containing water for circulation over the evaporator and for receiving water off of the evaporator during circulation thereof, and wherein the ice and beverage dispenser includes an ice retaining bin and a plurality of beverage dispensing valves coupled to the sump for receiving water therefrom, said method comprising the steps of selectively operating the ice maker to perform either an ice making cycle by circulating water from the sump over the evaporator while operating the compressor to freeze the water on the evaporator and subsequently hot gas harvesting the ice on the evaporator and delivering the harvested ice to the ice retaining bin, or to perform a water chilling cycle by circulating water from the sump over the evaporator while operating the compressor to chill, but not freeze, the water on the evaporator and thereby to chill the water in the sump and received by the beverage dispensing valves.

18. A method as in claim 12, including the step, performed in response to performance of an ice making cycle, of sensing the thickness of ice being formed on the evaporator and controlling performance of the ice making cycle to harvest the ice on the evaporator when it is formed to a selected thickness.

19. A method as in claim 12, including the steps of sensing the temperature of water in the sump and detecting the level of ice in the ice retaining bin, and in response to a sensed sump water temperature that is less than an upper setpoint temperature and to a detected level of ice in the ice bin that indicates that ice is needed in the bin, performing an ice making cycle.

20. A method as in claim 12, including the steps of sensing the temperature of water in the sump, measuring the duration of any current ice making cycle, and in response to a sensed sump water temperature that is at least equal to an upper setpoint temperature and to a duration of a current ice freezing cycle that is greater than a predetermined minimum time and less than a predetermined maximum time, performing a water chilling cycle.

21. A method as in claim 12, including the step of discontinuing performance of the water chilling cycle in response to a sensed sump water temperature that is no greater than a lower setpoint temperature.

22. A method as in claim 12, including the steps of sensing the temperature of water in the sump, measuring the duration of a current ice making cycle, and in response to a sensed sump water temperature that is at least equal to an upper setpoint temperature and to a duration of a current ice making cycle that is less than a predetermined minimum time, continuing performance of the current ice making cycle until its duration is at least equal to the predetermined minimum time, and then performing a water chilling cycle.

23. A method as in claim 17, including the step of discontinuing performance of the water chilling cycle in response to a sensed sump water temperature that is no greater than a lower setpoint temperature.

24. A method as in claim 12, including the steps of sensing the temperature of water in the sump, measuring the duration of a current ice freezing cycle, and in response to a sensed sump water temperature that is at least equal to an upper setpoint temperature and to a duration of a current ice freezing cycle that is at least equal to a predetermined maximum time, continuing performance to completion of the current ice making cycle, and then performing a water chilling cycle.

25. A method as in claim 19, including the step of interrupting performance of the water chilling cycle in response to a sensed sump water temperature that is no greater than a lower setpoint temperature.

26. A method as in claim 12, including the steps of sensing the temperature of water in the sump, measuring the duration of a current ice making cycle, and in response to a sensed sump water temperature that is at least equal to an upper setpoint temperature and to a duration of a current ice freezing cycle that is at least equal to a predetermined maximum time, continuing performance to completion of the current ice making cycle, then initiating performance of a subsequent ice making cycle, interrupting performance of the subsequent ice making cycle when its duration is at least equal a predetermined minimum time, and then performing a water chilling cycle.

27. A method as in claim 21, including the step of interrupting performance of the water chilling cycle in response to a sensed sump water temperature that is no greater than a lower setpoint temperature.

28. A method as in claim 12, wherein the icemaker compressor is a variable speed compressor and including the steps of sensing the temperature of water in the sump, determining the rate of change of sump water temperature with respect to time (DT/dt), controlling the variable speed compressor to increase the speed of the compressor if DT/dt is less than a first value and to decrease the speed of the compressor if DT/dt is greater than a second and greater value.

29. A method as in claim 17, including the steps sensing the temperature of water in the sump and detecting the level of ice in the bin, and wherein said selectively operating step is responsive to said sending and detecting steps to perform either an ice making cycle or a water chilling cycle.

30. A method as in claim 29, including the steps, performed in response to a sensed sump water temperature that is greater than an upper setpoint temperature, of controlling said selectively operating step to perform a water chilling cycle.

31. A method as in claim 29, wherein the compressor is a variable speed compressor, and including the steps of determining the sensed rate of change of sump water temperature with respect to time (DT/dt) and increasing the speed of operation of the compressor to lower the temperature of the evaporator if DT/dt is less than a first value.

32. A method as in claim 29, wherein the compressor is a variable speed compressor, and including the steps of determining the rate of change of sump water temperature with respect to time (DT/dt) and decreasing the speed of operation of the compressor to raise the temperature of the evaporator if DT/dt is greater than a second value.

* * * * *

UNITED STATES PATENT AND TRADEMARK OFFICE
CERTIFICATE OF CORRECTION

PATENT NO. : 7,059,141 B2
APPLICATION NO. : 10/833436
DATED : June 13, 2006
INVENTOR(S) : Kyle B. Elsom et al.

It is certified that error appears in the above-identified patent and that said Letters Patent is hereby corrected as shown below:

Title Page,
Item [75], line 5, after "IL (US)" insert the following:
-- Donald E. Wiley, Jr., Mason City, IA (US) --

Column 13, line 58, "12" should be -- 17 -- line 64, "12" should be -- 17 --

Column 14, line 4, "12" should be -- 17 -- line 12, "12" should be -- 17 -- line 16, "12" should be -- 17 -- line 25, "17" should be -- 22 -- line 29, "12" should be -- 17 -- line 38, "19" should be -- 24 -- line 42, "12 " should be --17 -- line 54, "21" should be -- 26 -- line 59, "12" should be -- 17 --

Signed and Sealed this

Eighth Day of January, 2008

JON W. DUDAS
*Director of the United States Patent and Trademark Office*